June 1, 1965 W. D. MERRILL ETAL 3,186,148
RENEWABLE PACK FLUID FILTER
Filed July 24, 1961
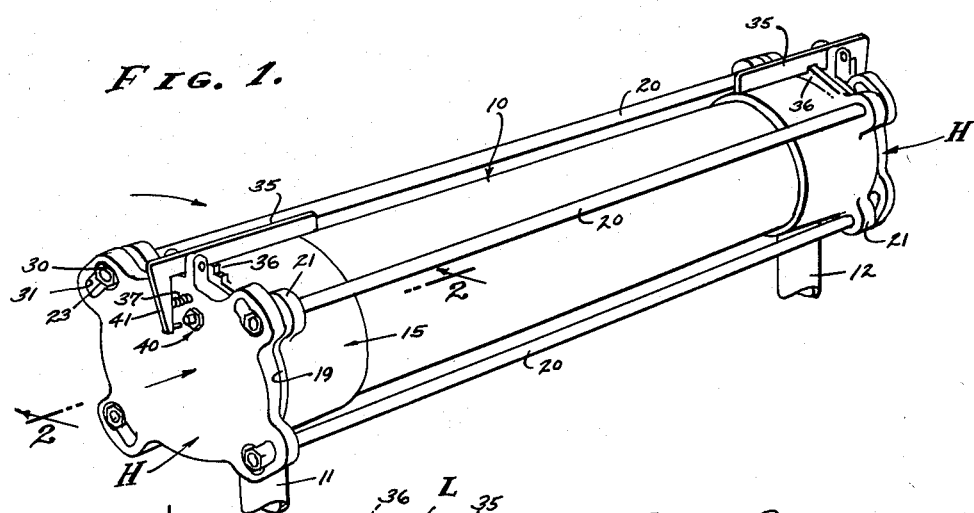
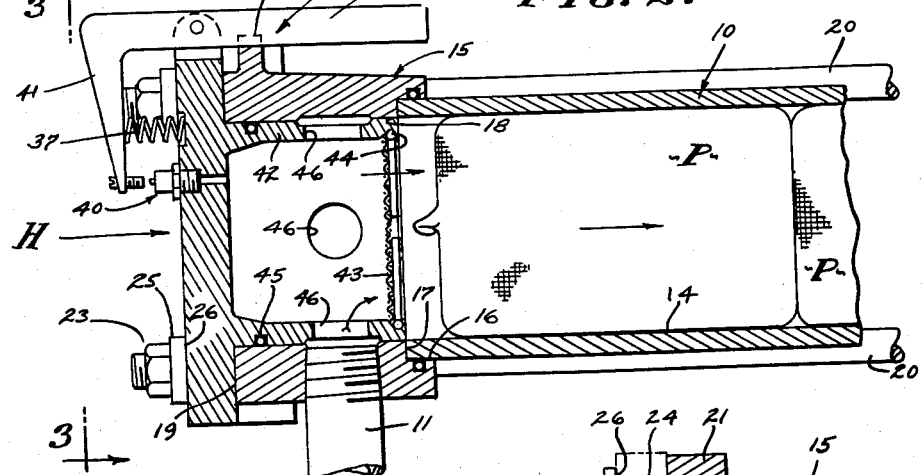
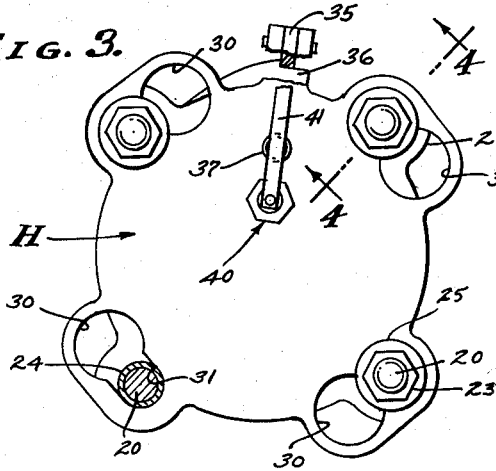
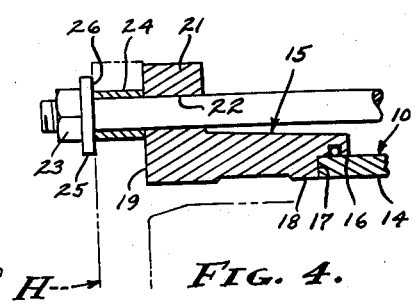
INVENTORS.
WALLACE D. MERRILL
JOHN A. HASLETT
BY
W. H. Maxwell
AGENT

United States Patent Office 3,186,148
Patented June 1, 1965

3,186,148
RENEWABLE PACK FLUID FILTER
Wallace D. Merrill, 27361 Stanford St., Hemet, Calif., and John A. Haslett, 414 N. Del Mar Ave., San Gabriel, Calif.
Filed July 24, 1961, Ser. No. 126,008
2 Claims. (Cl. 55—387)

This invention relates to a renewable pack fluid filter and is particularly concerned with facility in replacing the collected elements of said filters whereby moisture and other foreign substances are removed from a moving stream of fluid in a pipe-line or the like.

The present invention is intended primarily for use in air filters that are employed to remove vapors from air flow lines. For example, air compressors condense moisture and permit entry of oil mist into air flow lines, and it is imperative that said condensation and oil mist be removed in order to use the compressed air for certain purposes. Filters are used for this purpose and the type here under consideration employs replaceable packs of filtering materials, for example, diatomaceous earth or fuller's earth. These packs are shaped to be inserted into a barrel through which the air stream flows, during which process vapors are absorbed and retained in the filtering material. Obviously, these packs become saturated and must be periodically removed and replaced, and this replacement procedure is ordinarily time consuming with the usual air filter construction.

An object of this invention is to provide for quick and easy replacement of filter packs in a barrel type filter structure, so that the flow line involved is held out of service but a minimum length of time.

More specifically, it is an object of this invention to open one or both ends of a barrel type filter structure, preferably both ends, without the usual dismantling procedures that are usually resorted to. With the structure that we provide there are opposite heads that are quickly removable so that the filter packs can be removed and the interior of the barrel cleaned throughout its entire length. New filter pads or packs are readily inserted and the opposite heads replaced. The time period necessary for this procedure is virtually minimized.

It is an object of this invention to provide a quick release head structure for a filter barrel that is adapted to clean a fluid stream passing therethrough. The head positions the filtering packs so as to avoid obstruction to the inlet and outlet lines, and seals are established to prevent leakage under normal operating pressures.

It is still another object of this invention to provide a releasable head for a filter that locks in operating position and which cooperatively operates depressurizing means before removal from said position, thereby preventing explosive action when compressible fluids are being handled.

Also, it is an object to provide a filter and quickly removable and replaceable head structure therefor which involves the fewest number of parts and elements and which is simple and inherently clean and sanitary. With the structure that we provide each part is used to its full advantage with reliability and cleanliness, a foremost consideration.

The various objects and features of this invention will be fully understood from the following detailed description of the typical preferred form and application thereof, throughout which description reference is made to the accompanying drawings in which:

FIG. 1 is a perspective view of a typical embodiment of the present invention showing a barrel type filtering structure and wherein the head that we provide is shown in the process of being installed on the fitting at the left end of the structure.

FIG. 2 is an enlarged detailed sectional view taken substantially as indicated by line 2—2 on FIG. 1.

FIG. 3 is an end view taken as indicated by line 3—3 on FIG. 2.

FIG. 4 is a fragmentary sectional view of a portion of the structure (with the head shown in phantom lines) and taken as indicated by line 4—4 on FIG. 3.

The filter unit under consideration is of the barrel type having a tubular body 10 of substantial length and having inlet and outlet lines 11 and 12. The lines 11 and 12 enter and exit from the interior of the body through end fittings which are, for all intents and purposes, identical. Therefore, we will describe but one head end of the filter unit, it being understood that the following description relates to both ends, as clearly indicated in FIG. 1 of the drawings.

It is preferred that each end of the tube be provided with a head fitting 15. There is a bore at 16 to slidably receive the end portion of the body 10. The end of the body 10 is normal to the axis thereof and has flat engagement with a seat 17. A seal is carried by the fitting (or by the body) to close the joinder of these two connected parts. In this case, when a fitting 15 is employed the said fitting has a bore 18 forming a continuation of the bore 14 extending through the body 10. Also, lines 11 and 12 enter the said bores through the side walls of the fittings, said lines 11 and 12 comprising pipes screw-threaded into the fittings and opening into the bores 18, and spaced inward from the outer ends 19 of the fittings. Said end 19 is flat and normal to the axis of the structure.

In the preferred form the cylindrical body 10 and its opposite fittings 15 are secured together by a tie rod construction wherein laterally projecting ears 21 are provided at the periphery of the fittings, for example four at each fitting, with tie rods 20 extending through openings 22 in the ears. In accordance with the invention, referring to FIG. 4 of the drawings, the rods are fastened under tension by means of nuts 23 spaced from the end 19 by means of sleeves 24. The nut 23 and sleeve 24 at each fastening joint can be made as a single part, or they can be separately made as shown. This condition occurs at each end of all of the tie rods. Further, and in practice, a washer 25 is interposed between the nut and sleeve, thereby establishing a shoulder 26 opposing the end 19. In practice, the sleeves are identical in length so that the shoulders 26 freely clear the thickness of the head next to be described. The rods 20 are equally spaced circumferentially as shown in FIG. 3.

In accordance with this invention we provide the head H, as shown throughout the drawings, and which is essentially a flat plate with circumferentially spaced openings 30 to receive and freely pass the washers 25 (this is the condition illustrated in FIG. 1Q. As shown in FIG. 1 and at the lower left in FIG. 3 where one nut and washer is removed, a circumferentially disposed slot 31 of reduced size is provided to fit and receive the sleeve 24, the plurality of slots being disposed in a common direction, counter-clockwise as they are shown. The opening and slots form a keyhole through which the washer 25 can be passed and then the plate or head H turned clockwise as indicated by the arrow in FIG. 1 so that the head is fastened onto the fitting 15 at and overlying the end 19.

Lock means L is provided to secure the head H in the fastened position above related and to this end we provide a manually operable lever 35 carried by one part and engaging a tooth 36 on the other part. The tooth 36 is fixed on the fitting 15 while the lever 35 is carried by the shiftable and removable head H. The lever 35 in its normal position extends parallel to the axis of the structure to overlie the fitting 15 and the overlying end is yieldingly urged toward the fitting 15 by means of a spring 37. The tooth 36 faces clockwise to hold the lever and head in the position shown in FIG. 3, there being an inclined face leading to the vertex of the tooth whereby said lever is lifted automatically when the head H is turned into the working position shown and referred to.

In carrying out this invention there is means provided to depressurize the interior of the body 10 and this means is coordinated with the release of the head H by manipulation of the lever 35 to clear the tooth 36. For carrying out this function we provide a fluid release valve 40 of the type commonly employed to inflate pneumatic tires, and there is a pin projecting from an arm 41 extending from the lever 35 so that manipulation of the lever into a released position operates the valve 40 to exhaust pressure from the interior of the structure. Thus, explosion is eliminated and pressures are equalized within and without the structure so that the head H is easily turned relative to the fitting 15.

As shown in FIG. 2, the filter involves packs P, and in order to maintain these packs within the body 10 a liner 42 slidably enters the bore 18. Said liner 42 projects inwardly from the plate-shaped head H and is preferably integral therewith. At the innermost end of the liner there is a screen 43 held in place by a snap ring 44, thereby preventing particles from passing through the structure and said screen acting to position the end-most pack P.

In connection with the liner 42 there is a seal 45 carried thereby (or by the fitting 15) to close the joinder that is made between the separable parts. Further, and in order to have free passage of fluid from or to the lines 11 or 12, both the fitting 15 and liner 42 are channelled, as shown, with lateral ports 46 in the liner to conduct fluid flow laterally through the fitting and head structure.

From the foregoing it will be apparent that we have provided a simple and quickly operable head structure for a filter of the character under consideration. The manually operable levers 35 are readily accessible and upon their operation the heads are released simultaneously with release of pressure from within the structure. In order to remove each head H from the end fitting of the filter structure, it is merely necessary to turn the same counterclockwise a fraction of a turn, whereupon the head is removable in an axial direction away from the end 19.

With the heads removed the packs P are removable and the bore extending through the structure is unobstructed for cleaning purposes. It will be apparent that assembly of the filter structure is equally simple and can be carried out rapidly with a minimum loss of time.

Having described only a typical preferred form and application of our invention, we do not wish to be limited or restricted to the specific details herein set forth, but wish to reserve to ourselves any modifications or variations that may appear to those skilled in the art and fall within the scope of the following claims.

Having described our invention, we claim:

1. A fluid filter having a tubular body with at least one open end, and including, at least one porous bag of granular filtering material slidably entered into the body, inlet and outlet fluid flow lines opening into opposite ends of the body, said fluid flow line at said one open end of the body being disposed laterally of the body and spaced inward from the open end of the body, a removable plate overlying the end of the body, and a tubular liner carried by and projecting inwardly from the plate and entering the body to terminate inwardly of the said flow line, and a screen at the inner end of the liner engaging the bag of filtering material to position the same in the body, there being means to seal the plate with the end of the body outward of said laterally disposed flow line.

2. A fluid filter having a tubular body with at least one open end, and including, at least one porous bag of granular filtering material slidably entered into the body, inlet and outlet fluid flow lines opening into opposite ends of the body, said fluid flow line at said one open end of the body being disposed laterally of the body and spaced inward from the open end of the body, a removable plate overlying the end of the body, and a tubular liner carried by and projecting inwardly from the plate and entering the body to terminate inwardly of the said flow line, a screen at the iner end of the liner engaging the bag of filtering material to position the same in the body, and a port in the liner and open from within the liner to the said laterally disposed flow line, there being means to seal the plate with the end of the body outward of said laterally disposed flow line.

References Cited by the Examiner

UNITED STATES PATENTS

| | | | |
|---|---|---|---|
| 1,750,632 | 3/30 | Farmer | 55—518 X |
| 1,973,442 | 9/34 | Nelson | 220—44 |
| 2,212,647 | 8/40 | Nugent | 210—436 |
| 2,253,684 | 8/41 | Burckhalter | 210—232 X |
| 2,398,830 | 4/46 | Hamilton | 55—503 X |
| 2,400,658 | 5/46 | Shepherd | 285—190 |
| 2,605,901 | 8/52 | Morrison et al. | 210—450 X |
| 2,728,407 | 12/55 | Squier | 55—387 X |
| 2,767,803 | 10/56 | Henry | 55—495 |
| 2,845,138 | 7/58 | Gageby | 55—387 |

FOREIGN PATENTS

| | | |
|---|---|---|
| 1,068,541 | 12/52 | France. |
| 302,787 | 12/28 | Great Britain. |

REUBEN FRIEDMAN, *Primary Examiner.*

HERBERT L. MARTIN, *Examiner.*